(12) United States Patent
Nikitin et al.

(10) Patent No.: US 8,338,777 B2
(45) Date of Patent: Dec. 25, 2012

(54) APPARATUS AND METHOD FOR WELL LOGGING UTILIZING ASSOCIATE PARTICLE IMAGING

(75) Inventors: Anton Nikitin, Houston, TX (US); Alexandr Vinokurov, Novosibirsk (RU)

(73) Assignee: Bake Hughes Incorporated, Houston, TX (US)

( * ) Notice: Subject to any disclaimer, the term of this patent is extended or adjusted under 35 U.S.C. 154(b) by 45 days.

(21) Appl. No.: 12/877,423

(22) Filed: Sep. 8, 2010

(65) Prior Publication Data

US 2011/0062319 A1 Mar. 17, 2011

Related U.S. Application Data

(60) Provisional application No. 61/240,852, filed on Sep. 9, 2009.

(51) Int. Cl.
*G01V 5/08* (2006.01)
(52) U.S. Cl. .................................................. 250/269.6
(58) Field of Classification Search ................ 250/269.6
See application file for complete search history.

(56) References Cited

U.S. PATENT DOCUMENTS

| | | | |
|---|---|---|---|
| 3,366,790 A * | 1/1968 | Zagorites et al. | .......... 250/385.1 |
| 5,416,320 A | 5/1995 | North | |
| 5,608,215 A | 3/1997 | Evans | |
| 6,297,507 B1 * | 10/2001 | Chen et al. | ............... 250/370.11 |
| 2002/0150194 A1 * | 10/2002 | Wielopolski et al. | ......... 376/160 |
| 2002/0171560 A1 * | 11/2002 | Ciglenec et al. | ........... 340/853.1 |
| 2006/0227920 A1 | 10/2006 | Maglich | |
| 2008/0156997 A1 * | 7/2008 | Kearfott | ................... 250/390.04 |

FOREIGN PATENT DOCUMENTS

RU 2256200 C1 * 7/2005

OTHER PUBLICATIONS

Ussery et al., Deisgn and Development of the Associated Particle Three Dimensional Imaging Technique, Oct. 1994, Los Alamos National Laboratory, pp. 1-15.*
English Translation of RU 2256200, Khamatdinov et al., Nuclear Logging method an Device for its realization, Jul. 2005.*

(Continued)

*Primary Examiner* — Christine Sung
(74) *Attorney, Agent, or Firm* — Cantor Colburn LLP

(57) ABSTRACT

An apparatus for performing an operation in a borehole penetrating the earth includes a borehole tool and a neutron source within the borehole tool that emits neutron-alpha particles pairs as the result of a nuclear reaction. The apparatus also includes an alpha particle detector within the borehole tool arranged to detect when an alpha particle emitted by the neutron source strikes it and a gamma ray detector to detect gamma rays produced as a result of interactions between neutrons produced by the neutron source and at least one material in an area of interest outside of the borehole. The apparatus also includes a processing system that determines a characteristic of the area of interest based on a time difference between when the alpha particle strikes the alpha particle detector and a time when one or more gamma rays strikes the gamma ray detector.

8 Claims, 11 Drawing Sheets

OTHER PUBLICATIONS

Beyerle et al. "Associated particle imaging," Nuclear Science Symposium and Medical Imaging Conference, Nov. 2-9, 1991, pp. 1298-1304. [Abstract Only].

International Search Report and Written Opinion, Mailed May 30, 2011, International Appln. No. PCT/US2010/048233, Written Opinion 4 Pages, International Search Report 3 Pages.

Rhodes, E., et al. "Associated-Particle Sealed-Tube Neutron Probe: Detection of Explosives, Contraband, and Nuclear Materials"; Submitted to Moscow International Science and Technology Center Symposium Nuclear Physics Methdos for Detecting Smuggled Explosives and Nuclear Materials; Apr. 8-11; p. 1-13.

* cited by examiner

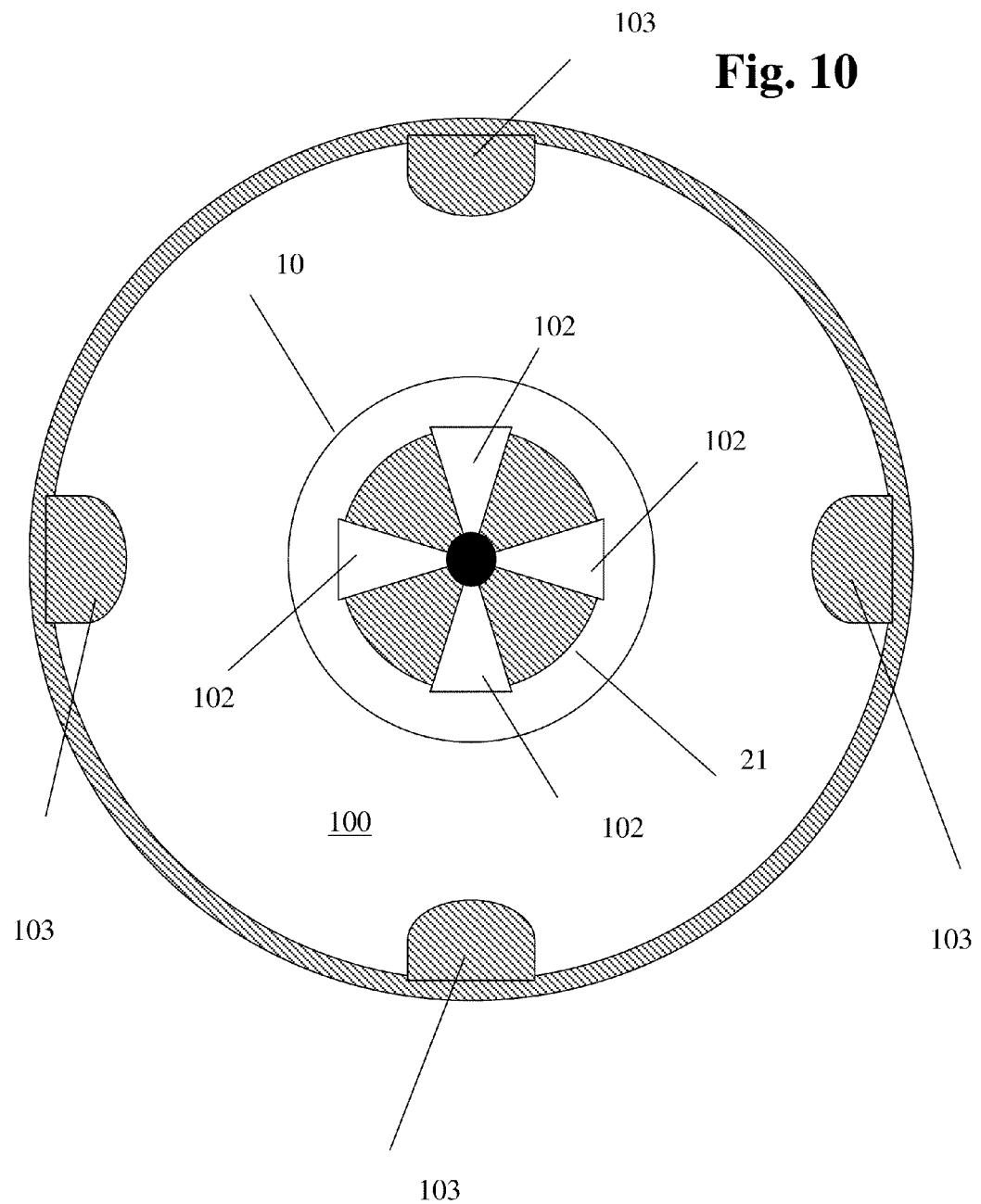

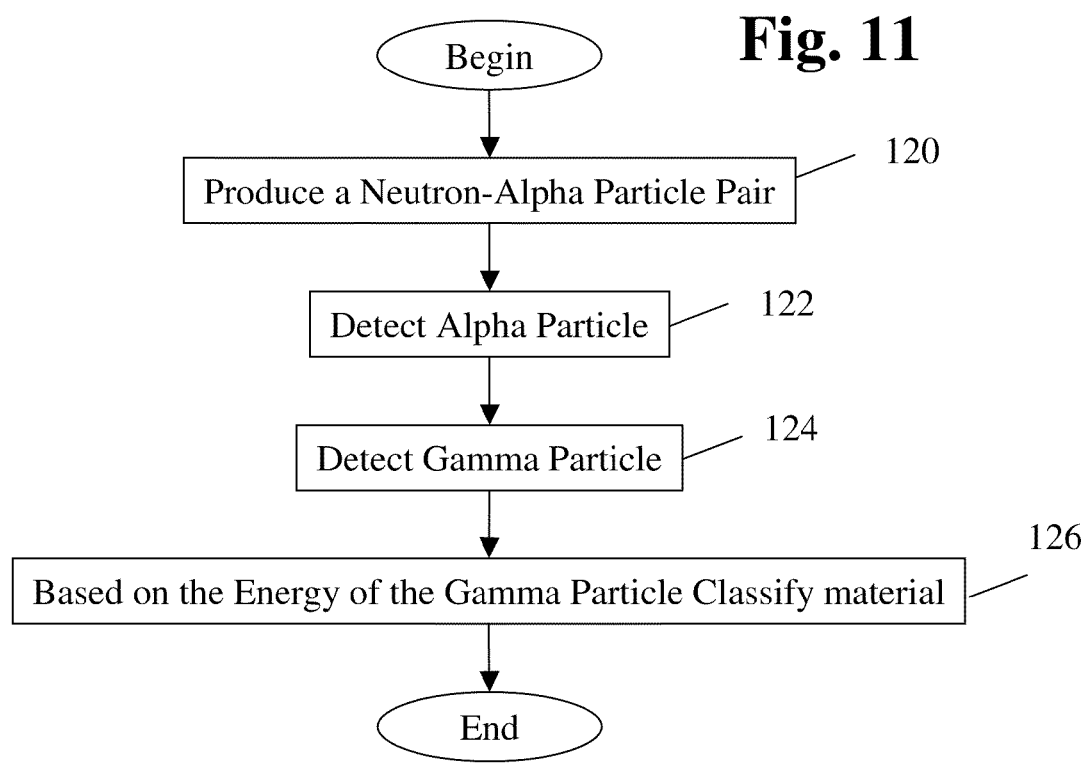

APPARATUS AND METHOD FOR WELL LOGGING UTILIZING ASSOCIATE PARTICLE IMAGING

PRIORITY CLAIM

This application claims priority under 35 U.S.C. §119(e) to U.S. Provisional Patent Application Ser. No. 61/240,852, entitled APPARATUS AND METHOD FOR WELL LOGGING UTILIZING ASSOCIATE PARTICLE IMAGING, filed Sep. 9, 2009, and which is hereby incorporated by reference in its entirety.

BACKGROUND

The invention disclosed herein relates well logging and, in particular, to systems and techniques to be utilized in well logging.

Various operations may be performed in a borehole penetrating the earth in the quest for hydrocarbons. The operations can be related to the exploration and production of hydrocarbons. One type of operation is known as well logging.

Well logging is a technique used to perform measurements of an earth formation, which may contain a reservoir of the hydrocarbons, from within the borehole. In well logging, a logging tool, configured to perform a measurement of the earth formation, is conveyed through a borehole penetrating the earth formation. An armored cable (wireline) is used to support and convey the logging tool through the borehole. In general, the wireline contains cables for supplying power to the logging tool and communicating data to and from the logging tool.

The logging tool can be configured to perform various types of measurements of the earth formation. Some of the measurements, such as elemental yields and porosity, require irradiating a portion of the earth formation with neutrons. The measurements of the results of interactions between the neutrons and the earth formation can be related to a property of the earth formation, such as the composition or the porosity of the earth formation.

SUMMARY

According to one embodiment, an apparatus for performing an operation in a borehole penetrating the earth is disclosed. The apparatus of this embodiment includes a borehole tool and a neutron source within the borehole tool that emits neutron-alpha particles pairs as the result of a nuclear reaction. The apparatus also includes an alpha particle detector within the borehole tool arranged to detect when an alpha particle emitted by the neutron source strikes it and a gamma ray detector to detect gamma rays produced as a result of interactions between neutrons produced by the neutron source and at least one material in an area of interest outside of the borehole. The apparatus also includes a processing system that determines a characteristic of the area of interest based on a time difference between when the alpha particle strikes the alpha particle detector and a time when one or more gamma rays strikes the gamma ray detector.

According to another embodiment, a method of measuring a parameter of a formation is disclosed. The method of this embodiment includes: lowering a borehole tool into a borehole penetrating the earth, the borehole tool including a neutron source, a gamma ray detector and an alpha particle detector; determining a first time that a first alpha particle strikes the alpha particle detector; associating a gamma ray, detected at a second time by a gamma ray detector, with the first alpha particle; and determining the parameter based on the second time and the energy of the detected gamma ray.

According to another embodiment, a method of measuring a parameter of a formation is disclosed. The method of this embodiment includes: irradiation the formation by a flow of neutrons from a neutron source located within a borehole tool located below the surface of the earth; measuring alpha particles with multiple alpha particle detectors; associating gamma rays detected by a gamma ray detector with the measured alpha particles; and determining a vertical component of an element in the formation based on a relationship between particles measured by different alpha particle detectors and the associated gamma rays.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 10 illustrates an embodiment of a tool that includes a mud displacer having mud channels passing through it; and FIG. 11 shows a flow chart of a method according to one embodiment.

DETAILED DESCRIPTION

For convenience, certain definitions are presented. The term "fusible" relates to atomic nuclei that can join together or fuse in a nuclear fusion reaction.

A device called neutron generator is used to initiate and contain the nuclear fusion reaction between deuterium (D) and tritium (T) nuclei with a fast neutron (n)-alpha ($\alpha$) particle pair as reaction products. Ions of these elements are accelerated inside of neutron generator and interact with each other through collisions. The collision of the D and T ions initiates the fusion reaction of interest. In one embodiment, the neutron generator is designed such that D-T collisions and fusion reactions between them take place in a confined area. As a result, the emission of neutrons born in this reaction can be approximated as a point neutron source.

The neutrons emitted by a neutron generator as described above are used to perform an operation downhole such as well logging. While embodiments of well logging are discussed for teaching purposes, the emitted neutrons can be used in any operation requiring an interaction between the neutrons and some material. For well logging, the neutrons interact with an earth formation or a material in a borehole.

Figure 1:
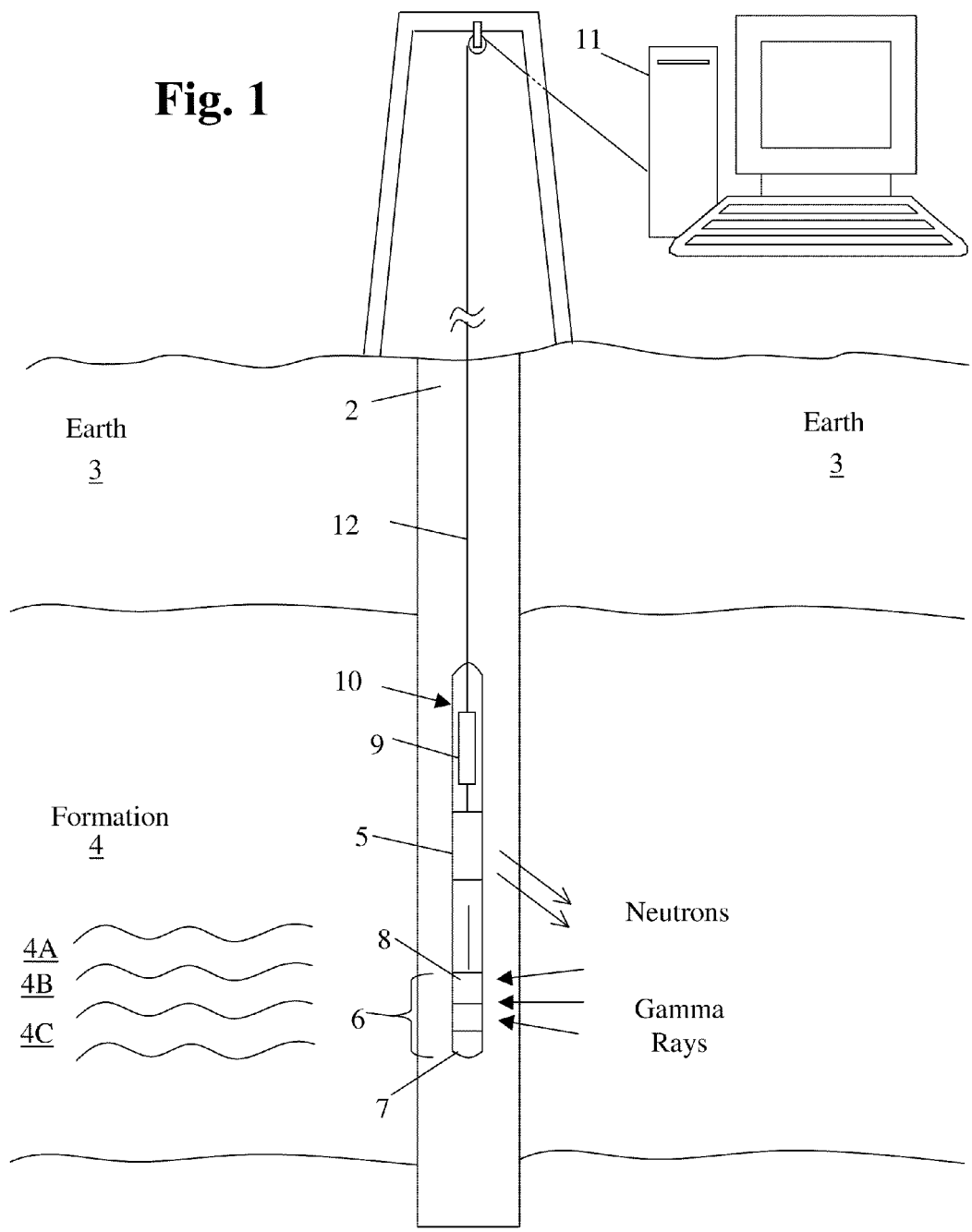
FIG. 1 illustrates an exemplary embodiment of a logging tool disposed in a borehole penetrating an earth formation.

FIG. 1 illustrates an exemplary embodiment of a logging tool 10 disposed in a borehole 2 penetrating the earth 3. Any element that is below a surface of the earth 3 shall be referred to herein as "downhole." The earth 3 includes an earth formation 4, which can include various layers 4A-4C. The logging tool 10 includes a neutron source 5. The neutron source 5 is configured to emit neutrons produced from a nuclear fusion reaction as discussed above. The neutrons travel into the formation 4 and interact with the elements in the formation 4. The logging tool 10 also includes an instrument 6 configured to detect and measure results of the interactions.

In one example of an interaction, a gamma ray is emitted from an interaction between a neutron and an element of the formation 4. Accordingly, the instrument 6 can be configured to detect the gamma ray and measure an amount of energy associated with the gamma ray. In an embodiment as a gamma ray detector, the instrument 6 in general includes a scintillator 7 and a photodetector 8. The scintillator 7 interacts with the gamma ray to produce an amount of light. The photodetector 8 measures the amount of light to determine the amount of energy associated with the gamma ray. Non-limiting properties of the formation 4 that may be determined with the logging tool 10 include porosity, elemental yields, density, and a boundary between layers 4A-4C.

In FIG. 1, the logging tool 10 includes an electronic unit 9. The electronic unit 9 can be used to operate the logging tool 10 and/or store data from measurements performed by the logging tool 10. For example, the electronic unit 9 can monitor components in the neutron source 5 and set parameters such as voltage levels to enable operation of the neutron source 5. When the electronic unit 9 stores data, the data can be retrieved when the logging tool 10 is removed from the borehole 2. Alternatively, the data can be transmitted to a processing system 11 disposed at the surface of the earth 3 using a telemetry system such as wired pipe or pulsed-mud for example. The processing unit 11 can also be configured to send commands to the logging tool 10.

A wireline 12 is used to support the logging tool 10 and to convey the logging tool 10 through the borehole 2. As an alternative, a slickline, coiled tubing or a drill string may be used to convey the logging tool 10 through the borehole 2.

For purposes of this discussion, the borehole 2 is vertical and the layers 4A-4C are horizontal. The teachings herein, however, can be applied equally well in deviated or horizontal wells or with the formation layers 4A-4C at any arbitrary angle. The teachings are equally suited for use in logging-while-drilling (LWD) applications and in open-borehole and cased-borehole applications. In LWD applications, the logging tool 10 may be disposed in a collar attached to the drill string. When used in LWD applications, drilling may be halted temporarily to prevent vibrations while the logging tool 10 is performing a measurement.

Figure 2:
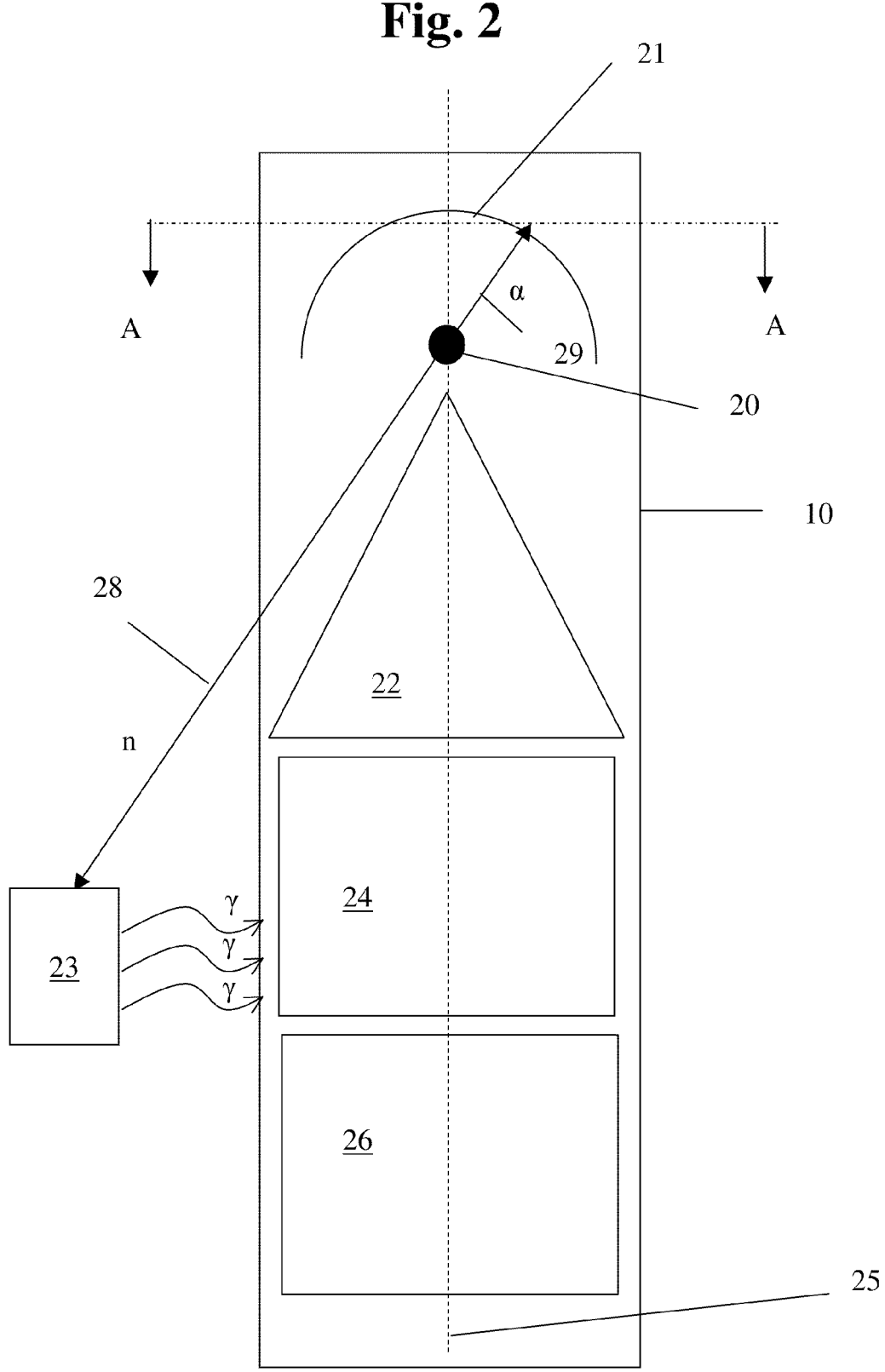
FIG. 2 illustrates an exemplary embodiment of a logging tool according to one embodiment.

FIG. 2 shows one embodiment of a logging tool 10. The logging tool 10 of this embodiment is configured to allow for associated particle imaging (API) techniques to be utilized to determine properties of an earth formation. The logging tool 10 includes a neutron source 20.

In one embodiment, the he neutron source 20 is a neutron generator using a Deuterium-Tritium (D-T) fusion reaction to produce neutrons. Of course, other types of neutron sources can be used.

The neutron source 20 is designed to contain a nuclear fusion reaction such as D-T fusion reaction. In general, parameters of the design of the neutron source 20 are selected to achieve a type or pattern of neutron discharge. For example, the factors can be selected to achieve a discharge of neutrons from approximately a point source. Alternatively, the factors can be selected to achieve a discharge of neutrons from a line source of a certain shape or from an area of a certain shape.

Some processes for generating neutrons by nuclear fusion reactions can also be optimized by using an automatic control system. In such systems, a controller provides control signals to a gas reservoir and a power supply and controls the operation of both.

In operation, the production of a neutron from the neutron source 20 also causes the production of an alpha ($\alpha$) particle. In FIG. 2, the direction of the neutron is arbitrarily shown by vector 28 and the direction of the particle is shown by vector 29. The vector 28 is in a direction 180 degrees from the direction of vector 29.

The logging tool 10 shown in FIG. 2 also includes an alpha particle detector 21. As shown, the alpha particle detector 21 is a hemispherical body. Of course, and as shown in greater-detail below, the alpha particle detector 21 may take on other shapes and formations depending on the context. For example, the alpha particle detector 21 is formed by one or more flat plates in one embodiment.

In general, the alpha particle detector 21 detects when an $\alpha$ particle strikes it. In one embodiment, the logging tool 10 shown in FIG. 2 it also includes first and second gamma ray detectors 24, 26. The gamma ray detectors 24, 26 detect gamma rays created by inelastic scattering by collision of the fast neutron with material outside of the logging tool 10. In general logging tool 10 can have one or more than 2 gamma ray detectors located inside of the tool relatively to the neutron source depending on the needs of the measurement scheme implementation.

The terms "inelastic collision," "neutron inelastic scattering" or "inelastic scattering" make reference to a collision in which an incoming neutron interacts with a target nucleus and causes the nucleus to become excited, thereby releasing a gamma ray before returning to the ground state. In inelastic collisions, the incoming neutron is not merged into the target nucleus, but transfers some of its energy to the target nucleus before that energy is released in the form of a gamma ray.

Various types of interactions involve either absorption or emission of gamma radiation. Predominant types (as a function of increasing energy) include photoelectric effect, Compton scattering and pair production. As a matter of convention, "photoelectric effect" relates to interactions where electrons are emitted from matter after the absorption of a gamma ray. The emitted electrons may be referred to as "photoelectrons." The photoelectric effect may occur with photons having energy of about a few eV or higher. If a photon has sufficiently high energy, Compton scattering or pair production may occur. Generally, Compton scattering relates to a decrease in energy (increase in wavelength) of a gamma ray photon when the photon interacts with matter. In pair production, higher energy photons may interact with a target and cause an electron and a positron pair to be formed. Regardless, the gamma ray detectors 24, 26 are selected to be able to detect the produced gamma rays. Of course, the logging 10 may include more or less than two gamma ray detectors depending on the context.

In one embodiment, the logging tool 10 includes a neutron shield 22 disposed between the neutron source 20 and the gamma ray detectors 24, 26. The neutron shield 22 helps keep neutrons from interacting with elements within the logging tool 10. As such, most of the detected gamma rays are primarily produced by targets outside of the logging tool 10.

The logging tool 10 shown in FIG. 2 allows API techniques to be applied in a downhole environment. API techniques are based on the use of the α particle emitted in the D-T reaction as a marker used to trace the direction of n emitted in the same fusion reaction event. API techniques also allow for determination of the distance from the neutron source 20 to the point in the space where the neutron inelastically interacts with the nuclei of the target. The "tracing" mechanism is provided by the configuration of the α particle detector 21 (for the direction) and the coincidence detection scheme of α particles and gamma rays emitted as a result of neutron inelastic scattering (for the distance). In the example shown in FIG. 2, the irradiated area is shown by area 23. The logging tool 10 shown in FIG. 2 has the elements (21, 22, 24 and 26) utilized in API techniques located along a center axis 25 of the tool 10. Such a configuration shall be referred to herein as an "axial" API logging tool. Of course, and as described in greater detail below, these elements could be disposed to one side or the other the center axis 25. It will also be appreciated that while two gamma ray detectors 24, 26 are shown, only one detector is needed for any logging tool within the scope of the present invention. Of course, more gamma ray detectors may be provided in some embodiments.

Figure 3:
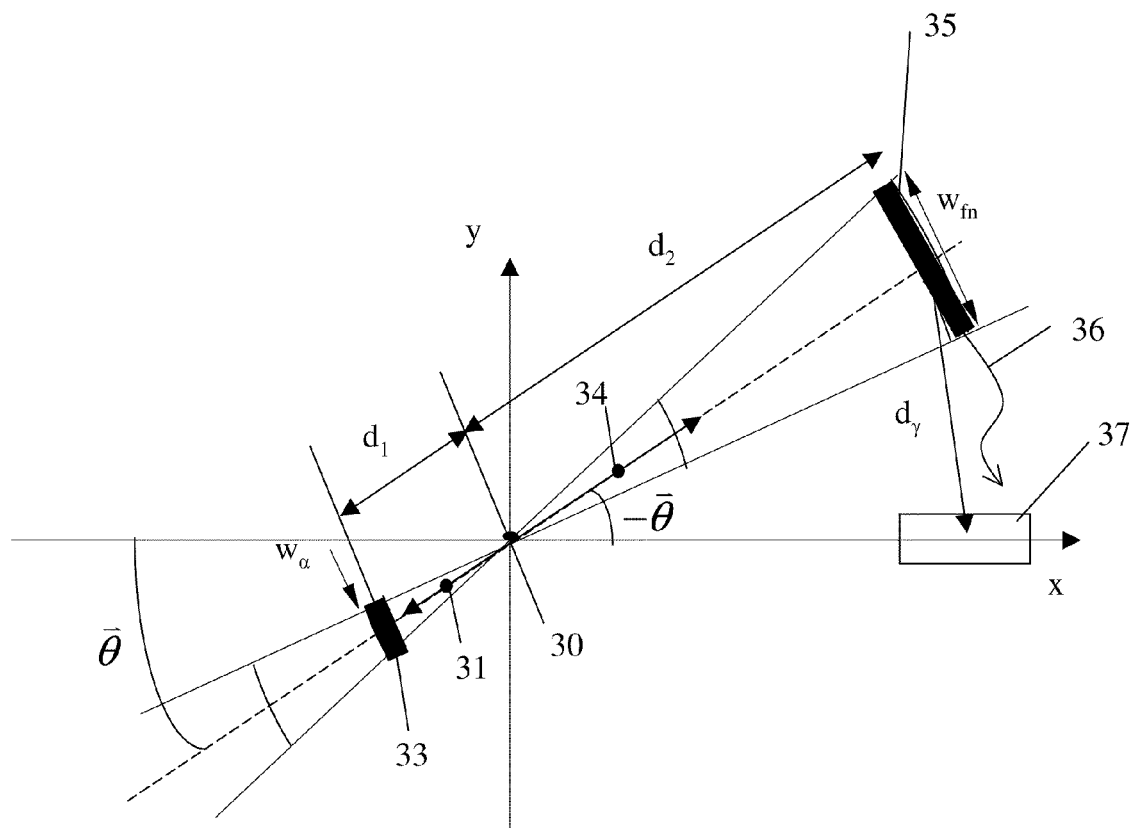
FIG. 3 illustrates a conceptual representation of an environment to illustrate general principles of associated particle imaging.

The following description refers to FIGS. 2 and 3 and relates to API techniques. It shall be understood that the API techniques here disclosed are applicable for each logging tool disclosed herein or in other types of logging tools. In one embodiment, the neutron source 20 is a neutron source that uses the D-T fusion reaction and the reaction is described by:

$$_1^2H(D) + _1^3H(T) + 0.1 \text{ MeV} \rightarrow _2^4He + n + 17.6 \text{ MeV} \quad (1)$$

and creates a fast neutrons flux with energy 14.1 MeV. The spatial distribution of the emitted neutron flux depends on the particular design of the neutron source 20 and is defined by the geometrical configuration of the source of deuterium and/or tritium ions and the target containing deuterium and/or tritium atoms. Because of the laws of energy momentum conservation, the following expressions are valid for neutron and α particle ($_2^4$He) formed in the reaction of equation (1):

$$E_{kin}(\alpha) + E_{kin}(n) \approx 17.6 \text{ MeV and} \quad (2)$$

$$\vec{p}(\alpha) + \vec{p}(n) \approx 0 \quad (3)$$

where the kinetic energy and momentum of D and/or T ions present in the system before reaction are neglected because 0.1 MeV<<17.6 MeV (the energy released in the reaction) and because 17.6 MeV is much smaller than the neutron rest mass ($m_n c^2$). It may also be assumed with high degree of precision that the system center of mass does not move.

Two consequences follow from equation 3. The first is related to how energy created in the reaction is distributed between neutron and the α particle. In the case of classical mechanics considerations, equation 3 can be rewritten as:

$$\frac{m_\alpha v_\alpha^2}{2} + \frac{m_n v_n^2}{2} = 17.6 \text{ MeV} \quad (4)$$

where $m_\alpha v_\alpha = m_n v_n$. Because $m_\alpha = 4 m_n$, equation 2 may be rewritten as $4E_{kin}(\alpha) = E_{kin}(n)$ and, thus, $E_{kin}(n) = 14.1$ MeV and $E_{kin}(\alpha) = 3.5$ MeV.

The second consequence is based on the conservation of momentum. For example 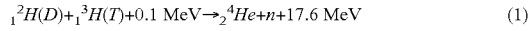 $\vec{p}(\alpha) = -\vec{p}(n)$. As such, neutron n and the α particle always move in exactly opposite directions ($\theta_1 + \pi = \theta_2$). By measuring the direction of α particle with the alpha detector 21, information about the direction of neutron (n) may be determined.

API relies upon the opposite travel directions of the neutrons and α particles. In API, generally, and as shown in FIG. 3 in particular, a point neutron source 30 is located at the 0 point of a coordinate system. It shall be assumed that it is possible to measure a time when an α particle 31 created in the source 30 and with a trajectory at angle $\vec{\theta}$ passing through an α particle detection zone 33 enters that zone. It shall be understood that the α particle detection zone 33 may be the alpha detector 21 shown in FIG. 2. For each detected α particle a fast neutron 34 created as result of the same reaction event travels in the opposite trajectory at angle $-\vec{\theta}$. The fast neutron 34 interacts with material in a "fast neutron interaction zone" (FNIZ) 35. The FNIZ 35 is an area of interest in a borehole in one embodiment. The interaction of the fast neutron 34 with a material in the FNIZ 35 is separated from the event of α particle detection in the α particle detection zone 33 by the time τ defined by:

$$\tau = d_2/v_n - d_1/v_\alpha, \quad (5)$$

where $v_n = 5$ cm/ns and $v_\alpha = \frac{1}{16} v_n$.

The inelastic interaction of the fast neutron 34 with the nucleus of the material in the FNIZ 35 causes the emission of a gamma ray 36 having an energy E that is defined by the material. This gamma ray 36 can be emitted in any direction with equal probability. In this example, a gamma ray detector 37 is separated by a distance dγ from the FNIZ 35. As such, the time between when a gamma ray 36 produced as a result of inelastic scattering of the fast neutron 34 in FNIZ 35 is possibly detected (assuming it strikes detector 37) and when an alpha particle is detected in the α particle detection zone 33 is τ' where τ' is equal to τ+dγ/c. Accordingly, it can be assumed that a gamma ray 36 detected at time τ' after an alpha particle 33 is detected is related to that alpha particle 33.

In terms of FIG. 2, it is assumed that it is possible to measure when alpha particles strike the alpha detector 21 and when gamma rays strike one of the gamma ray detectors 24, 26. In such a case, for each alpha particle that strikes the alpha detector 21 a corresponding gamma ray detector 24, 26 signal at time τ' later may be detected. As a result, if a gamma ray spectrum is accumulated using only pulses in the gamma ray detector signal which are separated by the time interval τ' from the α particle pulses, the resulting spectrum will consist of the inelastic gamma rays arriving to the detector from the target and carry corresponding elemental concentration information related to the target. As such, the location of the α particle detector 21 relatively to the neutron source 20 defines the direction (angle $\vec{\theta}$) and the time interval in the α particle—gamma ray detection relationship defines the length (distance $d_2$) of the vector identifying the location of the target by values of $\vec{\theta}$ and $d_2$. By varying this vector direction and length, the area outside of the tool 10 may be scanned to build an image using inelastic spectroscopic information.

It shall be understood that in the above example there is a probability to observed pulses in α particle signal and gamma ray detector signal separated by time interval τ' and corresponding to the gamma ray and α particle are independent of each other. That is, the detected gamma ray may not have been emitted due to the interaction of fast neutron born in the same D-T reaction event as a detected α particle was. However, the time distribution of the detected gamma rays uncorrelated with α particle detection events is uniform. As a result, the probability of detecting the uncorrelated gamma ray pulse is proportional to $\delta\tau/\tau'$ where $\delta\tau$ is the size of a time window of the coincidence detection scheme which defines the depth of FNIZ (the size of FNIZ in the $d_2$ direction) and special resolution of API measurements. In the ideal case, this window is defined by the resolution of the signal processing system used to analyze α particle detector signals and gamma ray detector signals (the minimal time interval between two pulses which could be resolved by the signal processing system). In reality, $\delta\tau$ may be bigger than the resolution limit because it is proportional to the inelastic signal count rate and, as a result, is chosen based on the balance between the acceptable time of the measurements and the quality of the measured spectrum (signal-to-statistical noise ratio).

Figure 4:
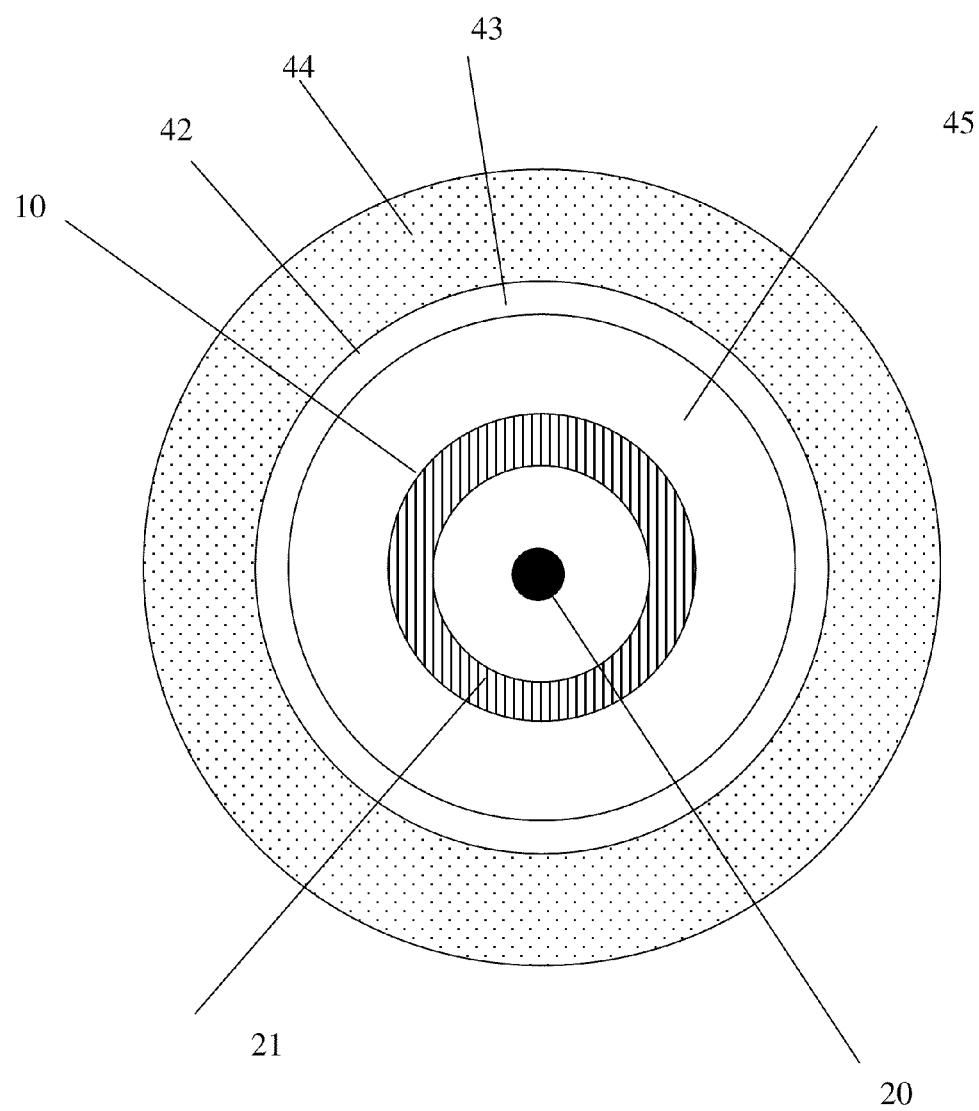
FIG. 4 is a cross-section top view of a logging tool according to one embodiment disposed within a borehole.

FIG. 4 shows a cross-sectional top view of the logging tool 10 shown in FIG. 2 taken along line A-A. In FIG. 4 the logging tool 10 is disposed within borehole 42. The logging tool 10 in this embodiment is surrounded by a mud displacer 45. The mud displacer 45 is separated from the borehole 42 by a channel 43. Channel 43 is filled with borehole mud in one embodiment. The borehole 42 is surrounded by formation 44. The formation 44 includes a FNIZ in one embodiment. As shown, the logging tool 10 is axially displaced within the borehole 42.

The logging tool includes an alpha detector 21. As illustrated, the alpha detector 21 is a hollow hemisphere. In one embodiment, the alpha detector 21 surrounds, at least partially, neutron source 20.

Figure 5:
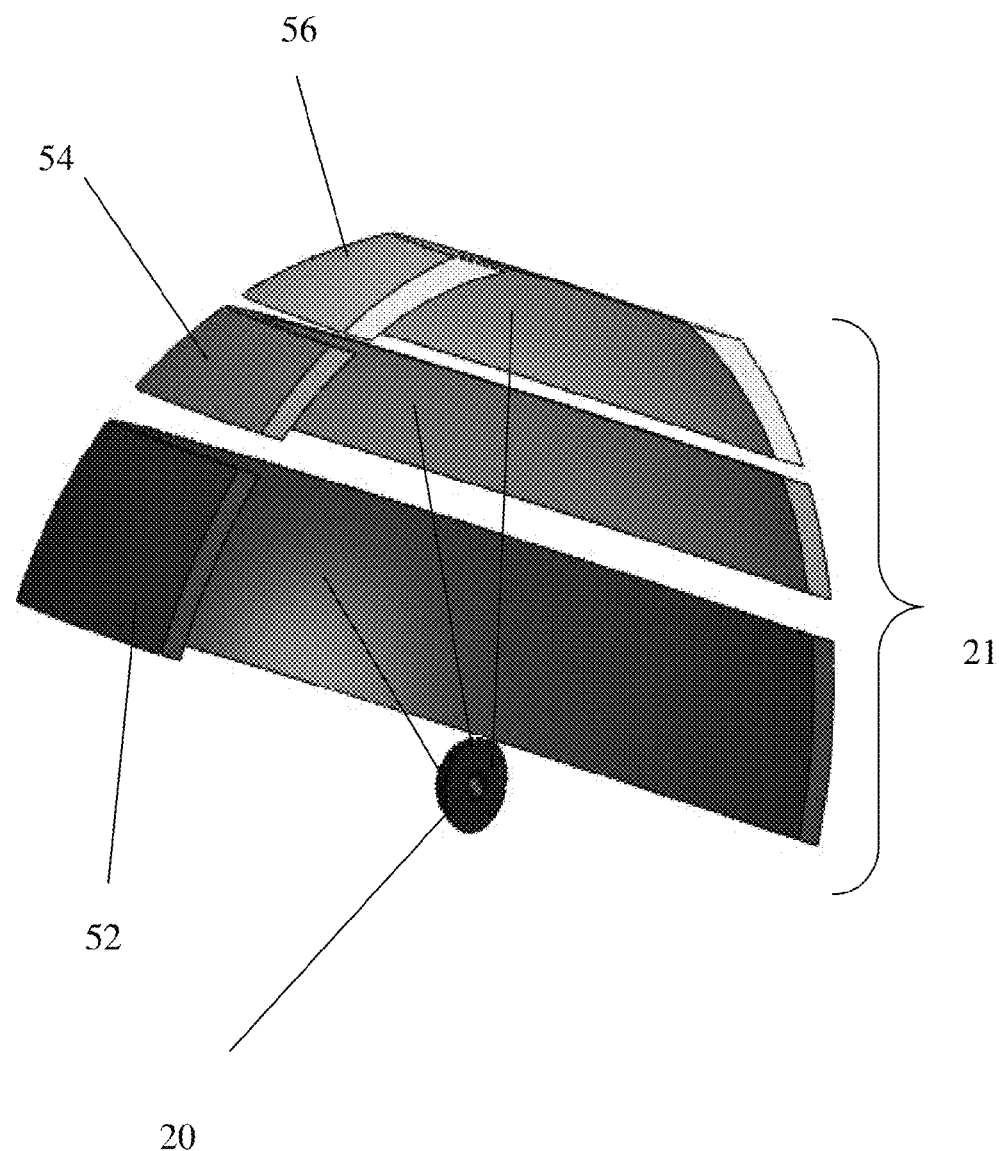
FIG. 5 illustrates a cut-away perspective view of an alpha detector according to one embodiment.

FIG. 5 illustrates a cut-away perspective view of an alpha detector 21 according to one embodiment. In this embodiment, the alpha detector 21 is formed by a plurality of concentric, circular sections. In particular, the alpha detector 21 is formed a bottom section 52, a middle section 54 and a top section 56. Each section 52, 54, 56 is a conic section having a dimensions in all three directions in one embodiment. In operation, depending on the direction of alpha particle travel, an of the sections 52, 54, 56 can be contacted by alpha particles emerging from the neutron source 20 having different trajectories. Depending on which detector section 52, 54, 56 is contacted it may be determined which direction the neutron traveled. Such information may be used to improve the spatial resolution of measurements made by a tool 10 including a multi-segment alpha detector 21 as shown in FIG. 2. Of course, the number of segments may be increased to increase resolution. In addition, it should be noted that the alpha detector 21 may include only a single segment, or two segments, and may not form a complete circle in some embodiments.

Figure 6:
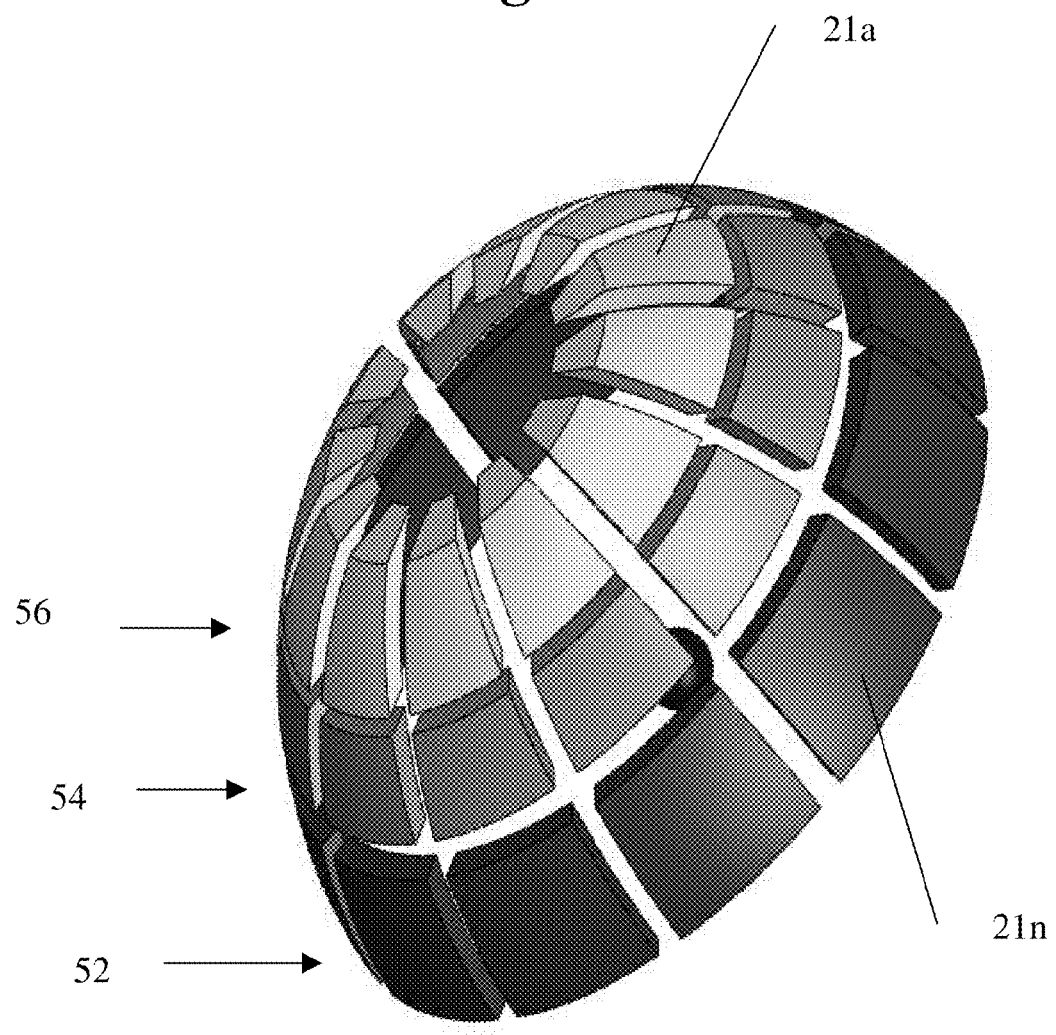
FIG. 6 illustrates an perspective view of an alternative embodiment of an alpha detector.

FIG. 6 illustrates a perspective view of an alternative embodiment of an alpha detector 21. The alpha detector 21 of this embodiment may provide azimuth resolution to API measurements. In particular, the alpha particle detector 21 includes a plurality of polar segments 52, 54, 56 formed of individual azimuth segments 21a-21n. In one embodiment, some or all of the azimuth segments 21a-21n act as a separate alpha detectors. In this manner, not only can the vertical direction be determined but also, the azimuth angle. In one embodiment, photodiodes can be used as a photodetectors to form a scintillation alpha particle detector configured as shown in FIG. 6. Also the array of flat semiconductor alpha particle detectors or diamond particle detectors of the shape similar to the shape shown in FIG. 6 can be used to detect alpha particles in this case.

The tools shown in FIGS. 2 and 4 may operate with or without a mud displacer. In some cases the borehole fluid (mud) can play an important role in the fast neutron thermalization where formation of a cloud of thermal neutrons serves as an "amplifier" of the gamma ray signal. In the case of the API measurements, the useful information is carried by the gamma rays emitted because of the inelastic scattering of the fast neutrons. To improve the useful signal, the attenuation of the fast neutron flux entering area 23 and the flux of inelastic gamma rays coming from area 23 should be minimized. This may, in one embodiment, be accomplished by the displacement of the borehole content with a low density/low hydrogen index material (e.g., "empty volume" would be ideal). Such displacement may be accomplished by using a mud displacer that could improve the performance of some of the API based measurement schemes.

In the case of "axial" API implementation, the inelastic gamma ray signal is collected from fast neutron interaction zones having a torus shape whose shape is based on the delay time $\tau'$ and the geometry of alpha detector. That is, the vertical component of the torus shape is related to the height and spacing of the alpha detector 21 or its plurality of portions when considered as a whole. In addition, the location of each fast neutron interaction zone (FNIZ) is characterized by two characteristic distances, $d_2$ and $d\gamma$, both shown in FIG. 3. Of course, the components (neutron source 20 and gamma ray detectors 24, 26) (FIG. 2) need not be axially displaced within the tool 10 or the borehole 42. Both of such cases shall be referred to as "non-axial" herein. In such cases the torus is not concentric with tool on one hand or the borehole on the other.

Figure 7:
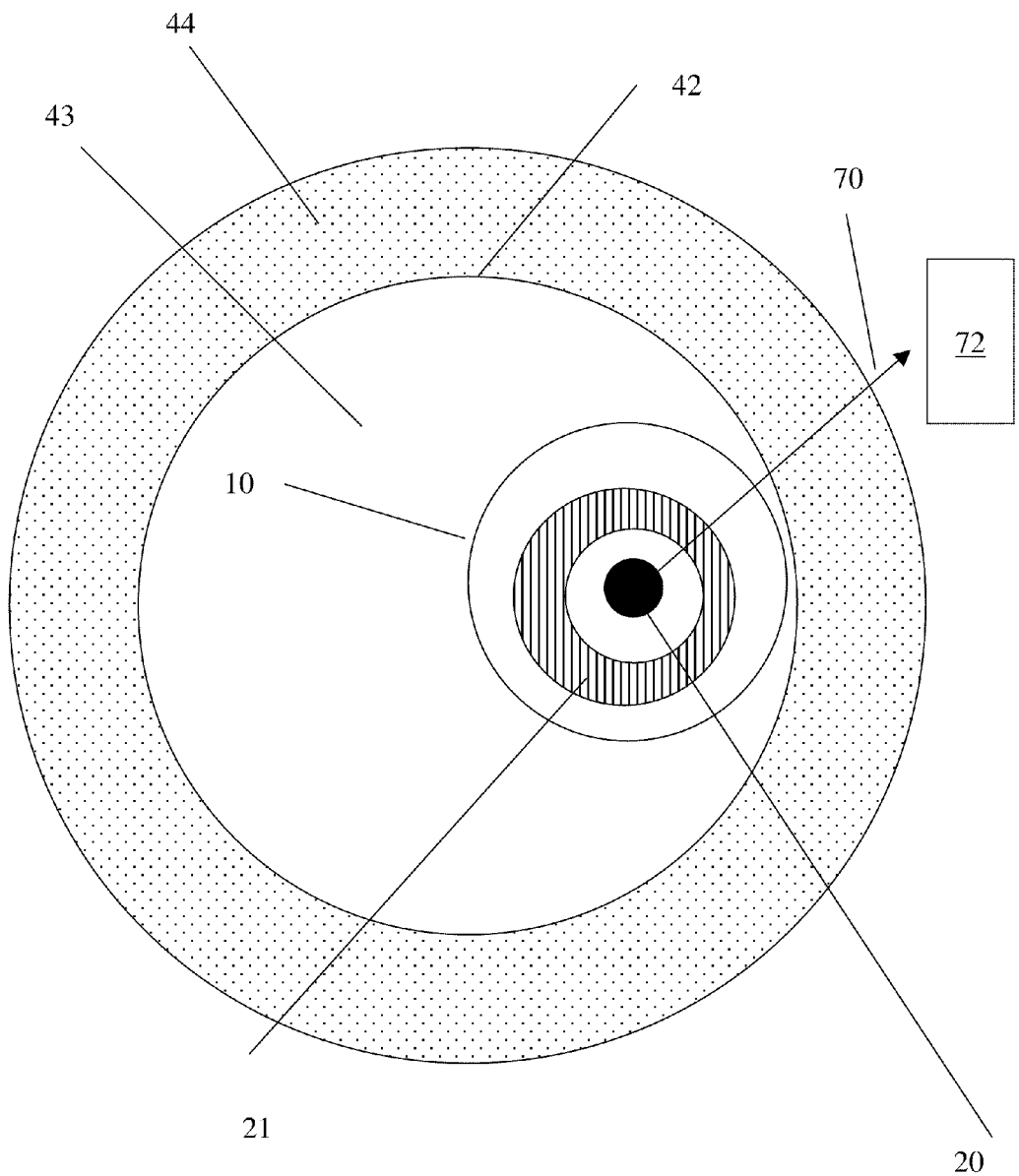
FIG. 7 illustrates a logging tool disposed in a borehole without a mud displacer.

FIG. 7 illustrates that the tool 10 of any embodiment disclosed herein may be disposed in a borehole 42 without a mud displacer. In such an embodiment, the tool may not be centered in the borehole 42. In the illustrated example, the tool 10 is pressed against the wall of the borehole 42 and is parallel to the borehole axis. The neutron source 20 and multisegmental alpha particle detector 21 of nonspheriacl shape may be configured in such a way that FNIZ 72 is located in the formation in the direction as shown by vector 70. Vector 70 extends generally outwardly away from a central axis of the borehole tool 10. The alpha particle detector 21 illustrated in FIG. 7 has a geometry that provides the location of all FNIZ's in the formation 44 while reducing borehole signal contribution into the signal measured by the gamma ray detector (not shown). The exact value of azimuth angle θ for the API measurement is defined by the particular tool design. In some instances, the logging tool 10 of this embodiment includes additional position sensing devices (not shown) allowing for measurements of the orientation of the tool in the borehole. In one embodiment, and as shown in FIG. 7, the direction of vector 72 may be controlled such that neutrons are only directed in a direction that does not pass through a central axis of the borehole 42.

Figure 8:
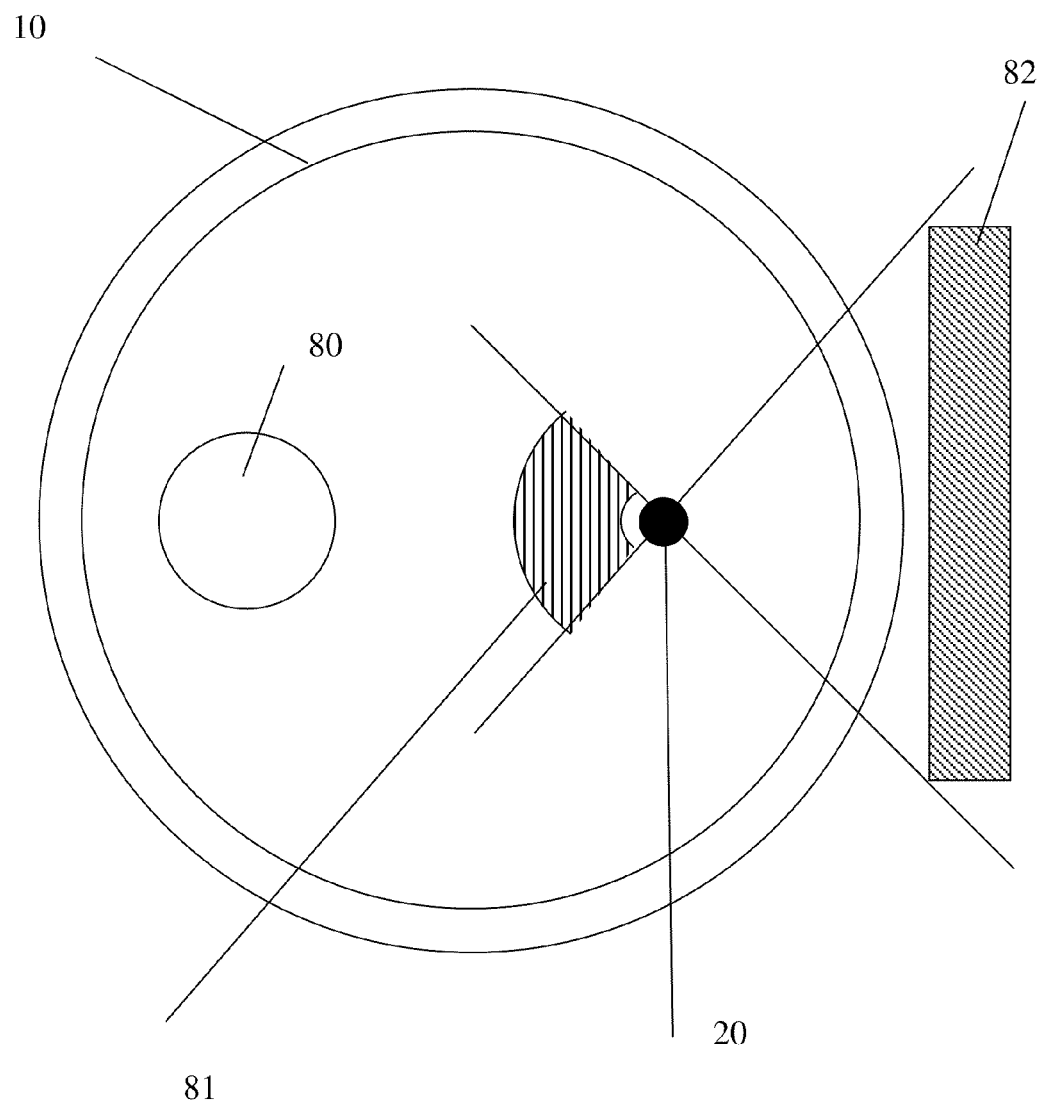
FIG. 8 illustrates a top-view of a tool according to one embodiment that includes a mud channel passing through it.

In another embodiment, the teachings herein may be applied to a logging while drilling situation. In such a situation, and as illustrated in FIG. 8, the tool 10 includes one or more mud channels 80 passing there through and may be part of a drill string. In such a tool, the components of FIG. 2 may be included but may not be axially located in the tool 10 because of space constraints. In one embodiment, because the tool 10 is rotating while in operation, it may be sufficient to monitor only neutrons that travel away from the mud channel 80. Further, monitoring only such neutrons reduces the effects of the mud channel 80 in any measurement. As such, and as illustrated in FIG. 8, the alpha detector 21 is formed of only a partial hemisphere 82 as opposed to the full hemisphere shown in prior examples. The partial hemisphere 82 is located between the neutron source 20 and the mud channel 80. In such a configuration neutrons that are emitted towards area of interest 82 (e.g., a FNIZ zone) produce alpha particles that strike the partial hemisphere 82. The radial extent of the partial hemisphere 82 can be varied depending on the context. In one embodiment, the partial hemisphere has a radial extent that varies from anywhere between 180 degrees to about 15 degrees.

Figure 9:
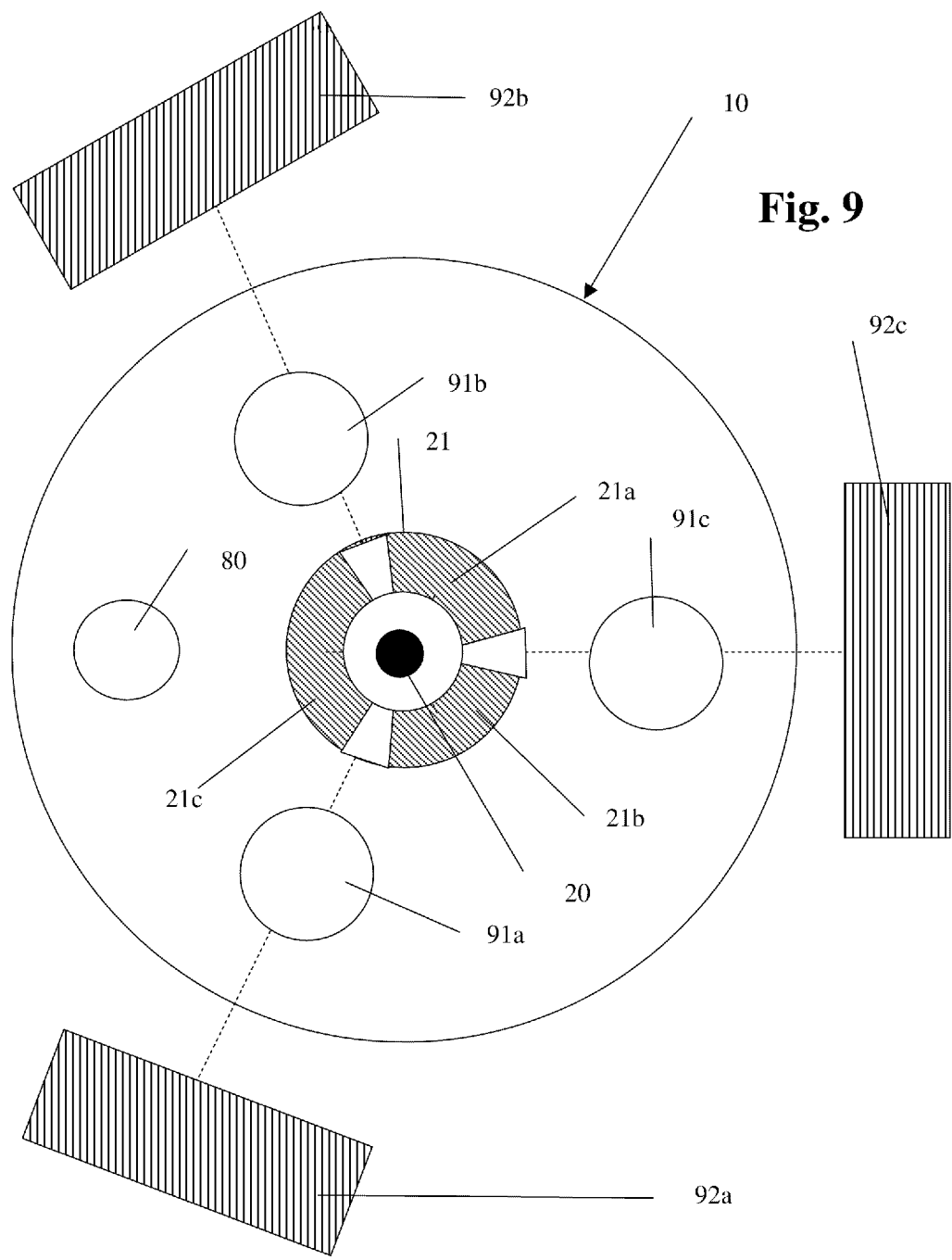
FIG. 9 illustrates a top-view of a tool according to another embodiment includes a mud channel passing through it.

FIG. 9 shows a top view of another embodiment of the tool 10. This embodiment includes a mud channel 80. In this embodiment, at least three gamma ray detectors 91a, 91b and 91c are included. The gamma ray detectors 91a, 91b, and 91c are radially displaced from a center of the tool 10 in the illustrated embodiment. Each gamma ray detector 91a, 91b and 91c is oriented to receive gamma rays from, for example, areas at different locations outside of the borehole (e.g., FNIZ's 92a, 92b and 92c). Each gamma ray detector 91a, 91b, and 91c is associated with a respective alpha detector portion 21a, 21b and 21c. Collectively the portions 21a, 21b and 21c form an alpha detector 21 and each portion is formed as a partial hemisphere in one embodiment. Each partial hemisphere portion 21a, 21b and 21c detects alpha particles related to the neutrons directed at the respective FNIZ's 92a, 92b and 92c.

FIG. 10 shows a top view of another embodiment of the tool 10. In this embodiment the tool 10 is surrounded by mud displacer 100. The mud displacer 100 includes mud channels 103. The mud channels 103 are arranged around the outside of the displacer 100 in this example. Of course, the mud channels 103 could be located in different locations.

In this embodiment, the alpha detector 21 includes spaces 102 formed therein. The location of these spaces is selected such that they oppose the location of the mud channels 103. That is, the remaining portions of the alpha detector 21 are arranged to ignore (i.e., not detect) alpha particles related to neutrons that would strike the mud channels 103.

Any of the above disclosed tools API techniques to perform particular measurements. For example, the API techniques may be utilized to: perform inelastic spectra measurements with high vertical resolution including high resolution C/O and Si/Ca well logging measurement; measure fast neutron attenuation coefficient of the formation ("sourceless" porosity measurements); and measure the gamma ray attenuation coefficient of the formation ("sourceless" density measurement).

In more detail, in current tools used for the inelastic spectra or C/O and Ca/Si ratio measurements, the vertical resolution is defined by the gamma ray detector signal collection area having a vertical size $w_{det}$ that depends on many parameters of a "tool-borehole-formation" system. The tool embodiments described above allow for improved control of the vertical resolution of all inelastic spectra based measurements without serious deterioration of the measured signal intensity and related decrease of the well logging speed. In particular, each $FNIZ_y^x$ can be characterized by shift in the vertical direction relatively to the neutron source $\Delta z_y^x$. As a result, for the inelastic signal measured for a particular $FNIZ_y^x$ the following equation describes the relationship between the tool position, the time of the measurements and the position of the area emitting the detected signal:

$$z_y^x = z_{ns} + \Delta z_y^x = v_l t + \Delta z_y^x \qquad (6)$$

where $v_l$ is the logging speed.

By adding signals $I_y^x(t)$ measured for different $FNIZ_y^x$ with proper time shifts corresponding to $\Delta z_y^x$ and multiplication by normalization coefficients $A_y^x$ together according to:

$$I(t) = \sum_{x,y} A_y^x I_y^x \left( t - \frac{\Delta z_y^x}{v_l} \right) \qquad (7)$$

the resulting sum I(t) corresponds to the signal emitted by/arriving from the area with the size equal to the averaged size of the fast neutron interaction zones ($\overline{w}_y^x$) at depth $z=v_l t$. Thus, a well log based on the interpretation of the I(t) signal will have vertical resolution equal to $\overline{w}_y^x$ and $\overline{w}_y^x < w_{det}$. It should be noted that the configurations of $FNIZ_y^x$ and values of $A_y^x$ are chosen according to the desired value of the vertical resolution of the measurements defined by $\overline{w}_y^x$ and Equation 7 allows for omission of the dramatic decrease of the resulting count rate in the measured signal I(t) and corresponding decrease of the well logging speed.

The above embodiments may also be utilized for the direct measurement of the formation fast neutron attenuation coefficient $L_{fn}$ (e.g., "sourceless" porosity measurements). For example, the integrated intensity of the measured gamma ray flux $I^{int}$ is proportional to the density of the fast neutron flux in $FNIZ_y^x$ and defined by:

$$I_{int} \sim A \frac{\exp(-L_\gamma \vec{l}^\gamma)}{(\vec{l}^\gamma)^2} \frac{\exp(-L_{fn} \vec{l}^n)}{(\vec{l}^n)^2} \qquad (8)$$

where A is a proportionality coefficient which takes into consideration the size of $FNIZ_y^x$ and $\vec{l}^n$ equals $d_2$ and $\vec{l}^\gamma$ equals $d_\gamma$ from FIG. 3 above. If $I_{int}$ is measured for two different $FNIZ_y^x$ regions such that $|\vec{l}_1^\gamma| = |\vec{l}_2^\gamma|$ and $|\vec{l}_1^n| \neq |\vec{l}_2^n|$ (such measurement can be accomplished using two gamma ray detectors) then $L_{fn}$, can be found from equation 9 below:

$$\frac{I_1^{int}}{I_2^{int}} \sim \frac{A_1}{A_2} \frac{\exp(-L_{fn} \vec{l}_1^n)}{(\vec{l}_1^n)^2} \frac{(\vec{l}_2^n)^2}{\exp(-L_{fn} \vec{l}_2^n)} \qquad (9)$$

where A and $\vec{l}^n$ are defined by the geometry of FNIZ's chosen for the measurements. The determined $L_{fn}$, contains information about the ability of formation to attenuate fast neutrons. $L_{fn}$, is proportional to hydrogen concentration $n_H$ in the formation (hydrogen index) because the dominant mechanism for fast neutrons to loose their energy during interaction with the formation is the elastic scattering on H nuclei. $n_H$ is proportional to the classical neutron porosity of the formation.

In addition, the above embodiments may allow for measurement of the gamma ray attenuation coefficient $L_\gamma$ of the formation (e.g., "sourceless" formation density measurements). There are several mechanisms that influence a medium's gamma ray scattering ability (defined by electronic density of the medium and which is proportional to formation density) on the spectrum of the gamma ray flux passing through this medium. These are mechanisms include:

the decrease of the absolute value of the total gamma ray flux ($I_{int} = \int I_d(E) dE$) where E is the gamma array energy and $I_d(E)$ is gamma ray spectrum detected by tool gamma array detector;

the decrease of the intensities of the photopeaks in the gamma ray flux spectrum $$\left(I_{ph}(h\nu) = \int_{h\nu-\Delta}^{h\nu+\Delta} I_d(E)dE\right);$$

the changes in the shape of the gamma ray flux spectrum $I_d(E)$ which can be characterized by the photopeak to Compton tail intensity ratio $$r_{photoC} = \frac{I_{ph}(h\nu)}{I_C(h\nu \to 0)}.$$

All these phenomena can be used to measure gamma ray attenuation coefficient $L_\gamma$ of the medium which is proportional to the density of the medium: $L_\gamma = \Sigma\sigma_i n_i \sim \Sigma Z_i n_i \sim \rho$. In the case of the laboratory measurements, gamma ray flux with known spectrum is passed through a slab of particular material (the "medium") having a known thickness. The spectrum of the passed gamma ray flux is measured and processed and the $L_\gamma$ value is identified.

Setups based on "axial" and "non axial" API implementations for the borehole measurements can be used to perform measurements similar to the described above lab measurements: $FNIZ_y^x$ located at different depths in the formation can be used as quasi sources of the gamma ray flux. In this case the inelastic spectra measured for several $FNIZ_y^x$ with different $\vec{l}^\gamma$ and $\vec{l}^n$ parameters are analyzed from the absolute intensities and spectral shape dependencies on $\vec{l}^\gamma$ and $\vec{l}^n$ and $L_\gamma$ can be identified.

The difference between the lab measurement scheme and the API measurements is related to the nature of the gamma ray source. In the case of lab measurements, the gamma ray flux used to probe the sample does not depend on the sample itself and the experiment geometry. In contrast, for the API based measurements the formation that plays the role of the sample influences on the amount of gamma rays born in different $FNIZ_y^x$ through fast neutron scattering/adsorption (in the case of the same FNIZ geometry) and these gamma rays play the role of the probing flux.

Several schemes for different API based measurements and data analysis can be utilized to identify $L_\gamma$ and $\rho$ of the formation. These include a "3 FNIZ measurement" scheme, an "equal $\vec{l}^n$ distance" scheme and a "spectral shape analysis" scheme.

In the case of the "3 FNIZ measurement" scheme the inelastic spectra are measured for 3 $FNIZ_y^x$ with different values of $\vec{l}^\gamma$ and $\vec{l}^n$. The integrated gamma ray flux $I_{int}$ is defined by equation 8 above. Three values of $I_{int}(\vec{l}^\gamma, \vec{l}^n)$ give 2 equations of type (9) allowing for the calculation of $L_{fn}$ and $L_\gamma$.

The "Equal $\vec{l}^n$ distance" scheme is based on the API measurements performed for two $FNIZ_y^x$ with different values of $\vec{l}^\gamma$ but same values of $\vec{l}^n$. Such measurement can be accomplished by using a tool having 2 gamma ray detectors as shown, for example, in FIG. 2. In this case the intensity of the oxygen photopeak $I_{ph}(h\nu)$ located at 6.14 MeV can be used to identify $L_\gamma$ according to equation 8 above. The gamma rays with 6.14 MeV energy have relatively high penetration depth in most formations. This high penetration capability and the presence of oxygen in almost every type of the formation make this inelastic photopeak suitable for the proposed measurement scheme. Of course, other photopeaks observed in the inelastic gamma ray spectrum could be used for the same purpose.

The use of the photopeak intensity instead of the integrated intensity of the spectrum allows for the exclusion of the influence of the gamma ray scattering cross-section dependence on gamma ray energy on the obtained results. As a result, systematic error of the determined $L_\gamma$ may be reduced.

The "spectral shape analysis" scheme uses the spectra measured for two $FNIZ_y^x$ with different values of $\vec{l}^\gamma$ and $\vec{l}^n$. In this case the ratios of the photopeak to corresponding Compton tail intensities ratios $r_{photoC}$ are used to identify $L_\gamma$. The spectral shapes depend on the gamma ray scattering ability of the medium between the source and the detector and are not influenced by the absolute intensity of the flux of the source. As a result proposed ratios do not depend on $\vec{l}^n$ and $L_{fn}$ defining the neutron flux intensity in $FNIZ_y^x$ and are functions of $\vec{l}^\gamma$, $L_\gamma$ and some coefficient C defining the particular geometry of both $FNIZ_y^x$. Of course, knowledge of the exact functional form of $r_{photoC}(L_\gamma, \vec{l}^\gamma, C, h\nu)$ may be necessary for this scheme development and could be found from the results of the Monte Carlo modeling of the gamma ray transport in different media.

The azimuth resolution provided by API measurements may allow for inelastic imaging. Such imager can be used both for LWD and wireline applications to obtain $I_{in}(h\nu, r, \phi, z)$ data and convert them into formation maps (distribution in the formation) of the "inelastic" element concentrations, C/O and Si/Ca ratios and other parameters which can be extracted from inelastic (prompt gamma) spectra.

Finally, the present invention may be used for "Ahead of the bit" measurement system based on the inelastic gamma ray signal detection. In particular, the inelastic gamma ray signal formed as the result of the interaction of the fast neutrons with the formation in front of the drill bit ("ahead of the bit" inelastic signal measurements). This may require, however, that the gamma ray detector(s) is in the drill bit itself. The fast neutron generator with alpha particle detector can be located at different distances from the detector (in drill bit or in drill collar). All detection schemes and measured data interpretation algorithms described above can be implemented are applicable for this API based measurement configuration.

While specific methods of determining specific values shown above have been disclosed, it shall be understood that all of them employ, to some degree or another, some basic methodology. Accordingly, FIG. 11 shows an illustrative method that may be practiced by any of the systems or as part of any of the methods disclosed herein. The illustrative method begins at block 120 an alpha particle-neutron pair is created as the result of a fusion reaction. As discussed above, the neutron and alpha particle travel in opposite directions. At a block 122 the alpha particle is detected. The alpha particle may be detected at a first time as described above. At block 124 a gamma particle is detected at a second time. In the event that the second time is separated from the first time by $\tau'$ (as defined above) the gamma particle is assumed to be associated with the detected alpha particle. Thus, based on the energy of the gamma rays receive at time $\tau'$, the constitute materials of a formation may be determined as indicated at block 126. Of course, by varying the time $\tau'$ the materials at different distances may be determined.

In support of the teachings herein, various analysis components may be used, including a digital and/or an analog system. For example, the processing system 11 (FIG. 1) may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a sample line, sample storage, sample chamber, sample exhaust, pump, piston, power supply (e.g., at least one of a generator, a remote supply and a battery), voltage supply, vacuum supply, pressure supply, cooling component, heating component, motive force (such as a translational force, propulsional force or a rotational force), magnet, electromagnet, sensor, electrode, transmitter, receiver, transceiver, antenna, controller, optical unit, chemical analysis unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of measuring a parameter of a formation, the method comprising:
   irradiating the formation with a flow of neutrons from a neutron source located within a borehole tool located below the surface of the earth;
   measuring alpha particles with a plurality of alpha particle detectors;
   associating gamma rays detected by a gamma ray detector with the measured alpha particles; and
   determining a vertical component of an element in the formation based on a relationship between particles measured by different alpha particle detectors.

2. The method of claim 1, wherein the alpha particle detectors are formed by circular rings.

3. The method of claim 2, wherein the alpha particle detectors are formed by concentric circular rings.

4. The method of claim 1, wherein the alpha particle detectors are formed by azimuthal sections.

5. The method of claim 1, wherein the alpha particle detectors are formed by one or more flat plates.

6. The method of claim 1, wherein the alpha particle detectors and the neutron source are both axially disposed within the borehole tool.

7. The method of claim 1, wherein the alpha particle detectors and the neutron source are both non-axially disposed within the borehole tool.

8. The method apparatus of claim 1, wherein the gamma ray detector is located within a drill bit.

* * * * *

UNITED STATES PATENT AND TRADEMARK OFFICE
CERTIFICATE OF CORRECTION

PATENT NO. : 8,338,777 B2
APPLICATION NO. : 12/877423
DATED : December 25, 2012
INVENTOR(S) : Nikitin et al.

Page 1 of 1

It is certified that error appears in the above-identified patent and that said Letters Patent is hereby corrected as shown below:

Title Page

Item (73), Assignee, line 1, "Bake Hughes" to read as --Baker Hughes--.

Item (56), Other Publications, Column 2, line 1, "Deisgn" to read as --Design--.

Item (56), Other Publications, Column 2, line 5, "an" to read as --and--.

On page 2, Item (56), Other Publications, Column 2, line 4, "Methdos" to read as --Methods--.

In the Specification

On column 2, line 36, "an perspective" to read as --a perspective--.

On column 6, line 23, "$\tau=d_2/v_n-d_1/v_a,$" to read as --$\tau=d_2/v_n-d_1/v_\alpha$--.

On column 8, line 36, "nonspheriacl" to read as --nonspherical--.

On column 10, line 24, "proportion al" to read as --proportional--.

On column 10, line 38, "$L_{fn},$" to read as --$L_{fn}$--.

On column 10, line 48, "$L_{fn},$" to read as --$L_{fn}$--.

On column 10, line 50, "$L_{fn},$" to read as --$L_{fn}$--.

In the Claims

On column 14, line 43, Claim 8, "method apparatus" to read as --method--.

Signed and Sealed this
Fifth Day of November, 2013

Teresa Stanek Rea
*Deputy Director of the United States Patent and Trademark Office*